(12) United States Patent
Miao et al.

(10) Patent No.: US 10,214,661 B2
(45) Date of Patent: Feb. 26, 2019

(54) ORGANIC SILICON COATING

(71) Applicant: HUNAN SOKAN NEW MATERIALS CO., LTD., Ningxiang, Hunan (CN)

(72) Inventors: Peikai Miao, Hunan (CN); Ping Li, Hunan (CN); Weiguo Wang, Hunan (CN)

(73) Assignee: HUNAN SOKAN NEW MATERIALS CO., LTD. (CN)

( * ) Notice: Subject to any disclaimer, the term of this patent is extended or adjusted under 35 U.S.C. 154(b) by 0 days.

(21) Appl. No.: 15/554,365

(22) PCT Filed: Nov. 30, 2015

(86) PCT No.: PCT/CN2015/095922
§ 371 (c)(1),
(2) Date: Aug. 29, 2017

(87) PCT Pub. No.: WO2017/024693
PCT Pub. Date: Feb. 16, 2017

(65) Prior Publication Data
US 2018/0057708 A1 Mar. 1, 2018

(30) Foreign Application Priority Data
Aug. 10, 2015 (CN) .......................... 2015 1 0486462

(51) Int. Cl.
| | | |
|---|---|---|
| C09D 183/00 | (2006.01) |
| C09D 183/04 | (2006.01) |
| C09D 133/16 | (2006.01) |
| C08L 83/04 | (2006.01) |
| C08K 3/10 | (2018.01) |
| C08K 3/36 | (2006.01) |
| C08L 15/02 | (2006.01) |
| C09D 133/08 | (2006.01) |
| C09D 201/10 | (2006.01) |
| C09J 183/04 | (2006.01) |
| C08J 7/04 | (2006.01) |
| C08G 77/04 | (2006.01) |
| C08G 77/20 | (2006.01) |
| C08G 77/00 | (2006.01) |

(52) U.S. Cl.
CPC ............ C09D 183/04 (2013.01); C08J 7/047 (2013.01); C08K 3/10 (2013.01); C08K 3/36 (2013.01); C08L 15/02 (2013.01); C08L 83/04 (2013.01); C09D 133/08 (2013.01); C09D 133/16 (2013.01); C09D 201/10 (2013.01); C09J 183/04 (2013.01); C08G 77/04 (2013.01); C08G 77/20 (2013.01); C08G 77/80 (2013.01); C08J 2321/00 (2013.01); C08J 2483/07 (2013.01)

(58) Field of Classification Search
None
See application file for complete search history.

(56) References Cited

U.S. PATENT DOCUMENTS

| | | | | |
|---|---|---|---|---|
| 5,145,761 A * | 9/1992 | Kubo | ................... | G03G 9/1134 428/407 |
| 5,753,751 A * | 5/1998 | Liao | ...................... | C08G 77/08 428/447 |
| 8,329,307 B2 * | 12/2012 | Pouchelon | .............. | C08L 83/04 428/447 |
| 2005/0038183 A1* | 2/2005 | Ahn | ........................ | C08L 83/08 524/861 |
| 2006/0014915 A1* | 1/2006 | Ahn | ........................ | C08L 83/08 528/15 |
| 2007/0092644 A1* | 4/2007 | Soutar | .................... | B41J 2/1433 427/240 |
| 2007/0160930 A1* | 7/2007 | Wang | .................... | G03F 7/0392 430/270.1 |
| 2009/0088524 A1* | 4/2009 | Koellnberger | ......... | B01J 31/185 524/588 |
| 2011/0318575 A1* | 12/2011 | Rolfes Meyering | .... | A61L 27/16 428/336 |

FOREIGN PATENT DOCUMENTS

| | | |
|---|---|---|
| CN | 1860182 A | 11/2006 |
| CN | 101400736 A | 4/2009 |
| CN | 101402732 A | 4/2009 |

(Continued)

OTHER PUBLICATIONS

First Office Action from Chinese Patent Application No. 201510486462.3.
Second Office Action from Chinese Patent Application No. 201510486462.3.
English Translation of International Search Report from International Application No. PCT/CN2015/095922 dated May 6, 2016 (3 pages).
Organosilicon Monomer and Polymer Char (English Abstract) (5 pages).

Primary Examiner — Melvin C. Mayes
Assistant Examiner — Colette B Nguyen
(74) Attorney, Agent, or Firm — Calfee, Halter & Griswold LLP

(57) ABSTRACT

The present invention provides an organic silicon coating including 20 to 40 parts of methyl vinyl organic silicon polymer by weight, 1 to 6 parts of methyl phenyl organic silicon polymer by weight, 5 to 15 parts of hydrogenated silicone oil, 5 to 10 parts of fluorinated acrylate monomer by weight, 5 to 15 parts of silicon dioxide by weight, 0.2 to 2 parts of inhibitor by weight, 0.1 to 1 part of auxiliary by weight, 0.1 to 1 part of thermal initiator by weight, 30 to 50 parts of organic solvent by weight, and 2 to 5 parts of metal catalyst by weight. The organic silicon coating provided by the present invention has good adhesion for a silicone rubber or fluororubber base material with no surface treatment.

10 Claims, No Drawings

(56) References Cited

FOREIGN PATENT DOCUMENTS

CN 103013331 A 4/2013
WO 20020098971 A1 12/2002

* cited by examiner

ORGANIC SILICON COATING

CROSS-REFERENCE TO RELATED APPLICATIONS

This application is the U.S. national stage entry of International Application No. PCT/CN2015/095922, filed Nov. 30, 2015, which claims priority to and the benefit of Chinese Patent Application No. 201510486462.3, filed on Aug. 10, 2015, the entire contents of which are incorporated herein by reference.

TECHNICAL FIELD

The present invention relates to the field of coating, more particularly, to an organic silicon coating.

BACKGROUND

Silicone rubber is a special synthetic rubber containing silicon atoms. Its molecular structure is:

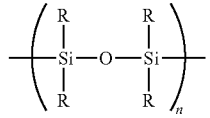

6000 to 7000 silicone units contained long chain is divided into two main categories of heating vulcanized silicone rubber and room temperature vulcanized silicone rubber (RTV vulcanized silicone rubber). For example, a silicone rubber waterproof coating disclosed in CN201510082164.8 uses silicone rubber as main material, which contains 20 to 30 parts of silicone rubber emulsion, 5 to 10 parts of VAE emulsion, 20 to 30 parts of deionized water, 1 to 5 parts of nano-$SiO_2$, 20 to 30 parts of white carbon, 1 to 2 parts of turpentine, 0.1 to 0.5 parts of sodium dodecyl benzene sulfonate (SDBS), 2 to 6 parts of hollow microspheres, 0.1 to 1 parts of leveling agent RM-2020, 1 to 2 parts of coupling agent, 1 to 2 parts of defoamers, 1 to 2 parts of dispersant, 0.1 to 0.5 parts of fungicide, 1 to 5 parts of bentonite. It is water-resistant and not susceptible to environment aging, and has a good mould proof effect. But this coating cannot be particularly applicable to the silicone rubber surface.

The fluororubber is a synthetic rubber with the molecular structure thereof containing fluorine atoms. There are many species and usually it is signified by the number of fluorine atoms of fluorine-contained units in the copolymer. Such as: fluororubber 23 is a copolymer of vinylidene fluoride and chlorotrifluoroethylene; fluororubber 246 is a copolymer of vinylidene fluoride, tetrafluoroethylene and hexafluoropropylene etc. The molecular structure of fluororubber 23 is:

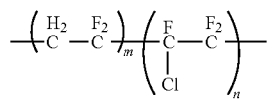

The fluororubber has excellent heat resistance, oil resistance and chemical resistance, and other features such as cold and steam resistance vary depending on the structure. In addition to military use, it has widely used in such fields as aerospace, automobile, industrial oil, petrochemical, industrial pollution control etc. The fluororubber is mainly used to fabricate such sealers as gasket, seal ring with heat resistance, oil resistance, chemical erosion resistance, and also used to produce hoses, impregnated products and protective equipment etc. For example, a fluororubber and preparation method thereof disclosed in CN201310421869.9 uses the fluororubber coating as main material, thereby increasing the adhesion of the resulting coating to the metal. The formulation of disclosed material contains 100 parts of fluororubber, 30 to 60 parts of carbon black, 3 parts of magnesium oxide (MgO), 6 parts of calcium hydroxide (CaOH), 1 to 5 parts of vulcanizing agent, 10 to 100 parts of silicone resin, 250 parts of organic solvent, 1 part of defoamer, 0.5 parts of leveling agent. But this coating cannot be particularly applicable to the fluororubber surface.

Since the various performance requirements for silicone rubber or fluororubber products in each field, coating is often coated on the surface of base material to promote the aesthetic appearance and some other special performance of the silicone rubber or fluororubber products, and in view of the special chemical structure of the base material, it has a poor mechanical performance, a strong inertia, a low surface energy, and general coating cannot attach thereon at all while some individual coatings can attach thereon only by corona or flame treatment of the silicone rubber or fluororubber base material. Even so, the coating still has a poor attachment onto the silicone rubber or fluororubber surface. The requirement for long-time use cannot be met. Those materials with low surface energy similar to the silicone rubber or fluororubber are more difficult to be attached by other present coatings.

SUMMARY

The purpose of the present invention is to provide an organic silicon coating for solving the technical problem that coating cannot be attached onto the material with low surface energy with no surface treatments.

The present invention provides an organic silicon coating comprising 20 to 40 parts of methyl vinyl organic silicon polymer by weight, 1 to 6 parts of methyl phenyl organic silicon polymer by weight, 5 to 15 parts of hydrogenated silicone oil by weight, 5 to 10 parts of fluorinated acrylate monomer by weight, 5 to 15 parts of silicon dioxide by weight, 0.2 to 2 parts of inhibitor by weight, 0.1 to 1 part of auxiliary by weight, 0.1 to 1 part of thermal initiator by weight, 30 to 50 parts of organic solvent by weight, and 2 to 5 parts of metal catalyst by weight.

Further, comprising 25 to 35 parts of methyl vinyl organic silicon polymer by weight, 3 to 5 parts of methyl phenyl organic silicon polymer by weight, 8 to 12 parts of hydrogenated silicone oil by weight, 7 to 9 parts of fluorinated acrylate monomer by weight, 8 to 12 parts of silicon dioxide by weight, 0.5 to 1.5 parts of inhibitor by weight, 0.3 to 0.6 part of auxiliary by weight, 0.3 to 0.7 part of thermal initiator by weight, 35 to 45 parts of organic solvent by weight, and 3 to 5 parts of metal catalyst by weight.

Further, consisting of 20 to 40 parts of methyl vinyl organic silicon polymer by weight, 1 to 6 parts of methyl phenyl organic silicon polymer by weight, 5 to 15 parts of hydrogenated silicone oil by weight, 5 to 10 parts of fluorinated acrylate monomer by weight, 5 to 15 parts of silicon dioxide by weight, 0.2 to 2 parts of inhibitor by weight, 0.1 to 1 part of auxiliary by weight, 0.1 to 1 part of thermal initiator by weight, 30 to 50 parts of organic solvent by weight, and 2 to 5 parts of metal catalyst by weight.

Further, consisting of 25 to 35 parts of methyl vinyl organic silicon polymer by weight, 3 to 5 parts of methyl phenyl organic silicon polymer by weight, 8 to 12 parts of hydrogenated silicone oil by weight, 7 to 9 parts of fluorinated acrylate monomer by weight, 8 to 12 parts of silicon dioxide by weight, 0.5 to 1.5 parts of inhibitor by weight, 0.3 to 0.6 part of auxiliary by weight, 0.3 to 0.7 part of thermal initiator by weight, 35 to 45 parts of organic solvent by weight, and 3 to 5 parts of metal catalyst by weight.

Further, consisting of 30 parts of methyl vinyl organic silicon polymer by weight, 5 parts of methyl phenyl organic silicon polymer by weight, 10 parts of hydrogenated silicone oil by weight, 8 parts of fluorinated acrylate monomer by weight, 10 parts of silicon dioxide by weight, 0.8 parts of inhibitor by weight, 0.5 part of auxiliary by weight, 0.5 part of thermal initiator by weight, 40 parts of organic solvent by weight, and 4 parts of metal catalyst by weight.

Further, the inhibitor is a coating inhibitor with deblocking temperature of ≥80° C.

Further, the molar ratio of methyl and phethyl in the methyl phenyl organic silicon polymer is 4 to 8:1.

Further, the curing condition of the silicon coating is to complete curing at 90° C. to 180° C. in 10 to 120 min; the coating thickness of the organic silicon coating is 5 to 50 μm.

Further, the base material suited for the organic silicon coating is silicone rubber, fluororubber, PC, ABS, PC/ABS, PMMA, PA, TPU, PBT, PET, stainless steel, magnesium alloy or aluminum alloy; the organic silicon coating is suitable for the base material with surface energy of ≥20× $10^{-5}$.

Further, the base material suited for the organic silicon coating is silicone rubber or fluororubber.

The present invention has beneficial effects as below:

1. The organic silicone coating provided by the present invention has good adhesion for a silicone rubber or fluororubber base material with no surface treatment. Specifically, after the coating is arranged on the surface of the silicone rubber or fluororubber, soaking the base material in boiling water for 120 minutes, there is no abnormal changes on the surface and no damage to the adhesive force.

2. The organic silicon coating provided by the present invention has such a fast reaction curing speed that the curing reaction needed for coating use can be reached only in 15 min, reducing production cycle and improving productivity. And film reaction temperature can be lowered up to 90° C., which reduces energy consumption.

3. The organic silicon coating provided by the present invention can attach onto the silicone rubber surface without corona or flame treatment, reducing processes, shortening production cycle, enhancing productivity.

4. After coating the organic silicon coating provided by the present invention onto the silicone rubber or fluororubber, the performance of the coating can be like: the coating tested under constant humidity and temperature of 65° C./90% RH can resist sunscreen, hand cream for as long as 168 hours; there is no anomalies for the coating after spraying continuously for 240 hours in a continuous spraying test using neutral salt spray; there is no anomalies for the coating during 3000 hours in a xenon lamp aging test; there is no anomalies for the coating after a total of 10 cycles with 12 hours as one cycle in a hot and cold impact test; the water contact angle of resulting coating is greater than 100° and the oil contact angle is greater than 90°. In room temperature, the water contact angle of the resulting coating may still be greater than 100° after being soaked in diesel mainly composed of hexadecane for 10 min, showing that this coating still has self-cleaning ability after this coating is subjected to heavy oil material.

5. The organic silicon coating provided by the present invention can adjust color thereof, further enriching aesthetic appearance of the silicone rubber or fluororubber products in various applications.

Beside the purpose, characteristics and advantages described above, the present invention has other purposes, characteristics and advantages. The present invention will be further described in detail as below.

DETAILED DESCRIPTION OF THE PREFERRED EMBODIMENT

The present invention will be described in detail below with combination of embodiments, but the present invention may be embodied in many different forms as defined and covered by the claims.

The technical solution used in the embodiments, if not specified, is the conventional solution well known by those in the art.

The percentage sign "%" involved herein, if not specified, refers to the percentage of mass; but the percentage of solution, unless otherwise specified, refers to that 100 ml solution contains several grams of solute; the percentage between liquids refers to the percentage of capacity in 20° C.

The main chemical structure of the organic silicon coating provided by the present invention is Si—O bond and Si—C bond whose stability is much higher than C—C bond. This plays a vital role in helping the organic silicon resist the effects of different factors and maintain stability. Also, this confers the organic silicon a high heat resistance and high temperature oxidation resistance, and enables a more electromagnetic radiation resistance and particle resistance (ultraviolet and α, β, γ radiation) than the organic plastic.

The metal catalyst herein refers to common metal family of catalysts with solid catalyst as main active component, for example, such transition element as Fe, Co and Ni, including single metal catalyst and polymetallic catalyst. Preferably, the metal catalyst is one or more of a platinum complex metal catalyst, a rhodium complex metal catalyst, or a nickel complex metal catalyst. Using above metal catalysts can optimize the reactivity. It will be neither too fast nor slow. The auxiliary herein refers to common various auxiliaries in the field. The methyl vinyl organic silicon polymer in the present invention is a main film forming material, which may be one or more of REN50, REN60 or REN80 of Wacker, Germany. The methyl vinyl organic silicon polymer in the present invention is an auxiliary film forming material, which may be BYK-322, BYK-164 of BYK-Chemie, Germany supplying principle performance for the coating film. The hydrogenated silicone oil in the present invention includes ethylene hydrogen silicone oil and/or methyl hydrogen silicone oil serving as the an auxiliary film forming material, which may be one or more silicone oil of AK50, AK100, AK350, AK500 of Wacker, Germany that reacts with the principal film forming material to provide main performance for the coating film. The silicon dioxide in the present invention is a powder well known by those in the art, which may be one or more silicon dioxide of AEROSIL R972, AEROSIL R 202, AEROSIL R816 of Degussa, Germany that cause an effective extinction in the coating film to reach an ideal appearance and feel.

The thermal initiator herein may be azobisisobutyronitrile (AIBN) and/or benzoyl peroxide, or other similar thermal initiators for coating.

The present invention provides an organic silicon coating comprising 20 to 40 parts of methyl vinyl organic silicon polymer by weight, 1 to 6 parts of methyl phenyl organic silicon polymer by weight, 5 to 15 parts of hydrogenated silicone oil by weight, 5 to 10 parts of fluorinated acrylate monomer by weight, 5 to 15 parts of silicon dioxide by weight, 0.2 to 2 parts of inhibitor by weight, 0.1 to 1 part of auxiliary by weight, 0.1 to 1 part of thermal initiator by weight, 30 to 50 parts of organic solvent by weight, and 2 to 5 parts of metal catalyst by weight.

Coating formed by cross-linking curing the methyl vinyl silicone polymer, hydrogenated silicone oil and fluorinated acrylate monomer contained in the organic silicon coating provided by the present invention has similar chemical groups and structures as the silicone rubber or fluororubber, thereby improving significantly the adhesion of the resulting coating to silicone rubber or fluororubber. Under the case that the silicone rubber or fluororubber doesn't need any pretreatments prior to coat the coating, so that the resulting coating can be preferably attached on the surface of the silicone rubber or fluororubber. Through the test, the adhesion of the coating is 100/100. An effective attachment on the silicone rubber or fluororubber is actually achieved. As such, color adjustment of the silicone rubber or fluororubber can be achieved only by changing the coating color.

The metal catalyst and thermal indicator with the proportion in above formulation provided by the present invention has a strong thermal catalytic activity, the metal catalyst and thermal indicator can significantly foster the reaction speed and cross-linking degree of hydrogen addition of the methyl vinyl silicone polymer and hydrogenated silicone oil, thereby shortening the coating curing time and promoting productivity. And side effects in the cross-linking process are inhibited, production of atrament is avoided, and the problem of the resulting coating surface being prone to yellow and black in use is overcomed.

Every resin and monomer in the coating formulation provided by the present invention has a promoted thermal reaction activity through the metal catalyst and initiator, wherein the methyl vinyl silicone polymer, hydrogenated silicone oil and fluorinated acrylate monomer forms a network cross-linking structure after free radical addition reaction, so that embedding of the silicon dioxide in the coating tightly forms an interpenetrating polymer network of IPN, which is conducive to long-term stability for performance of the coating such as scratch and wear resistance. Embedding of the silicon dioxide can enhance the wear resistance of the formed three-dimensional cross-linking network. At the same time, distribution of the added silicon dioxide in the three-dimensional cross-linking network results a hydrophobic, oleophobic surface of micron-nanometer magnitude formed on the coating surface. The hydrophobic, oleophobic capacity of the resulting coating is promoted. If the adding amount of each component changes, not only the hydrophobic, oleophobic surface of micron-nanometer magnitude cannot be obtained, but also transfer and accumulation of the silicon dioxide readily occurs in the three-dimensional cross-linking network, which precipitates powder on the coating surface and further affects the coating quality. After mixing according to above proportion, the silicon dioxide powder in the resulting coating can preferably disperse in the formed network, improving the resulting coating quality.

The inhibitor herein refers to a coating inhibitor which can lock the activity of metal catalyst in the environment for preventing its catalysis when in a temperature lower than 80° C., and can unlock the metal catalyst for normal catalysis of it when in a temperature higher than 80° C. For example, the low temperature inhibitor purchased from Shenzhen Ousibang New Material Co., Ltd., since the catalytic activity of the metal catalyst is very high, the inhibitor needs to be added into the coating composition to prevent cross-linking reaction in room temperature for keeping the coating maintain film forming capacity during storage and prolonging the storing time, so adding inhibitor is necessary.

The methyl vinyl silicone polymer herein refers to the polymer with a molecular formula of Formula (I).

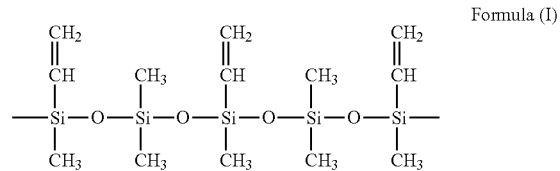

The methyl contained in the methyl vinyl silicone polymer in this formulation can endow the coating a good flexibility, hydrophobicity and high curing speed, so that the paint film after film formation has a good resistance to ultraviolet light and aging. And the vinyl endows the coating a high thermal stability, toughness and resistance to oxidation from oxygen in air. The methyl and vinyl can endow the resin a good film performance and construction performance, both of which cooperate effectively when in a molar ratio of 4~8:1. Preferably, when in a molar ratio of 6:1, the flexibility of the film and the construction performance can achieve best results.

Preferably, comprising 25 to 35 parts of methyl vinyl organic silicon polymer by weight, 3 to 5 parts of methyl phenyl organic silicon polymer by weight, 8 to 12 parts of hydrogenated silicone oil by weight, 7 to 9 parts of fluorinated acrylate monomer by weight, 8 to 12 parts of silicon dioxide by weight, 0.5 to 1.5 parts of inhibitor by weight, 0.3 to 0.6 part of auxiliary by weight, 0.3 to 0.7 part of thermal initiator by weight, 35 to 45 parts of organic solvent by weight, and 3 to 5 parts of metal catalyst by weight. The coating resulted from mixing in such proportion has a good oil-resistance and high stiffness, a larger contact angle so that the oil cannot stay on the coating surface for a long time. Also, the coating can maintain original water contact angle after soaking in the oil.

Preferably, consisting of 20 to 40 parts of methyl vinyl organic silicon polymer by weight, 1 to 6 parts of methyl phenyl organic silicon polymer by weight, 5 to 15 parts of hydrogenated silicone oil by weight, 5 to 10 parts of fluorinated acrylate monomer by weight, 5 to 15 parts of silicon dioxide by weight, 0.2 to 2 parts of inhibitor by weight, 0.1 to 1 part of auxiliary by weight, 0.1 to 1 part of thermal initiator by weight, 30 to 50 parts of organic solvent by weight, and 2 to 5 parts of metal catalyst by weight. At this point, the adhesive force of the coating to the silicone rubber or fluororubber achieves the best.

More preferably, consisting of 25 to 35 parts of methyl vinyl organic silicon polymer by weight, 3 to 5 parts of methyl phenyl organic silicon polymer by weight, 8 to 12 parts of hydrogenated silicone oil by weight, 7 to 9 parts of fluorinated acrylate monomer by weight, 8 to 12 parts of silicon dioxide by weight, 0.5 to 1.5 parts of inhibitor by weight, 0.3 to 0.6 part of auxiliary by weight, 0.3 to 0.7 part of thermal initiator by weight, 35 to 45 parts of organic solvent by weight, and 3 to 8 parts of metal catalyst by weight. At this point, the anti-aging effect of the coating achieves the best.

More preferably, consisting of 30 parts of methyl vinyl organic silicon polymer by weight, 5 parts of methyl phenyl organic silicon polymer by weight, 10 parts of hydrogenated silicone oil by weight, 8 parts of fluorinated acrylate monomer by weight, 10 parts of silicon dioxide by weight, 0.8 parts of inhibitor by weight, 0.5 part of auxiliary by weight, 0.5 part of thermal initiator by weight, 40 parts of organic solvent by weight, and 4 parts of metal catalyst by weight. At this point, each performance of the coating achieves the best. The water contact angle may be up to 140°, the oil contact angle may be up to 110°, while the water contact angle after soaking in oil being still 138°. At this point, each performance of the resulting paint film achieves the best.

The organic silicon coating is suitable for the base material of rubber such as silicone rubber, fluororubber; plastics such as PC (polycarbonate), ABS (acrylonitrile-butadiene-styrene copolymer), PC/ABS (polycarbonate/acrylonitrile-butadiene-styrene copolymer composites), PMMA (polymethylmethacrylate), PA (nylon), TPU (thermoplastic polyurethane elastomer rubber), PBT (polybutylene terephthalate), PET (polyethylene terephthalate); glass; metal (stainless steel, magnesium alloy, aluminum alloy etc.). This coating used on the surface of above base material has a good film performance, in particular, a good adhesive capacity. Preferably, it is suitable for silicone rubber, fluororubber, PC, ABS, PC/ABS, PMMA, PA, TPU, PBT, PET, stainless steel, magnesium alloy or aluminum alloy. At this point, the excellent adhesive capacity of the coating to above material and every coating performance can be brought into full play. More preferably, the base material suited for the organic silicon coating is silicone rubber or fluororubber. At this point, this coating can well adhere to the material surface of the silicone rubber or fluororubber with low surface energy, which fills in the technical gaps in the field.

The organic solvent used therein may be the diluent commonly used in various coatings, preferably, one or more of tasteless kerosene, n-heptane, ethyl acetate, butyl acetate. At this point, the dilution effect of the organic solvent achieves the best. Adding diluent as above proportion can prevent the coating from being too thin or too thick, which is conducive to the leveling property of film coating.

Preferably, the fluorinated acrylate monomer is a monofunctional fluorinated acrylate monomer. At this point, the stiffness and adhesive force of the formed three-dimensional cross-linking network achieves the best.

Preferably, the auxiliary is one or more of leveling agent, anti-settling agent or wetting and dispersing agent. Employing these auxiliaries can mitigate a low adhesive force of coating due to the low surface energy of the silicone rubber or fluororubber.

Preferably, the curing condition of the silicon coating is that curing is completed at 90° C. to 180° C. in 10 to 120 minutes. For example, when the thickness of the coating is 5 μm, it only takes 10 minutes to complete curing in 90° C. Preferably, the coating thickness of the organic silicon coating is 5~50 um. Coating and curing under such situation allows the resulting coating to have a good adhesion to the material with surface energy of $20 \times 10^{-5}$ N/cm, while maintaining a good wear-resistance, hydrophobicity, performance of abrasion resistance and anti-aging for the coating. At the same time, decrease in adhesion due to over-coating on the coating material is avoided.

Embodiments

The methyl vinyl organic silicon polymer in the following embodiments is one or more polymer of REN50, REN60 or REN80 of Wacker, Germany. The methyl vinyl organic silicon polymer is BYK-322, BYK-164 of BYK-Chemie, Germany.

The hydrogenated silicone oil is one or more of AK50, AK100, AK350, AK500 of Wacker, Germany.

The type of the fluorinated acrylate monomer is Viscoat 8F or Viscoat 8FM purchased from Organic Chemical Industry Co., Ltd, Osaka.

The inhibitor is one or more coating inhibitor purchased from Shenzhen Ousibang New Material Co., Ltd., this inhibitor has a deblocking temperature of ≥80° C. against the metal catalyst.

The auxiliary is leveling agent, anti-settling agent, wetting and dispersing agent, being one or more auxiliary series of products of Dili Baleong, Japan, Dow Corning, U.S., BYK-Chemie, Germany etc.

The metal catalyst is one or more catalyst of PL-3 and/or PL-4 of Toshiba, Japan.

The organic solvent is one or more of tasteless kerosene, n-heptane, ethyl acetate or butyl acetate.

The thermal initiator is azobisisobutyronitrile and/or benzoyl peroxide.

The material and instrument used in following embodiments are commercially available. The surface energy of the base material used therein is $\geq 20 \times 10^{-5}$ N/cm.

The preparation method for organic silicon coating in Embodiment 1~7 as follows:

(1) After adding into a disperse container and stirring in 600~1000 r/min for 5 to 10 minutes, adding silicon dioxide slowly while scattering for stirring in 1200~2000 r/min for 20 to 30 minutes, finally adding the inhibitor and special auxiliary for stirring in 400~800 r/min for 5 to 10 minutes.

(2) Pre-mixing: Adding the metal catalyst and thermal initiator into above mixture for stirring in 100~300 r/min for 5 to 6 minutes, then the coating product can be obtained.

Coating curing method for organic silicon coating in Embodiment 1~7: Coating the spray paint prepared in Embodiment onto the silicone rubber base material, the film of the coating being 15 microns thick, then baking in an over of 90° C. for 25 minutes.

The formulations for organic silicon coating in Embodiment 1~7 are listed in Table 1.

TABLE 1

The formulations for organic silicon coating in Embodiment 1~7 (by weight)

| | | Embodiment No. | | | | | | |
|---|---|---|---|---|---|---|---|---|
| | | 1 | 2 | 3 | 4 | 5 | 6 | 7 |
| methyl vinyl silicone polymer | | 25 | 30 | 40 | 35 | 20 | 20 | 35 |
| hydrogenated silicone oil | | 8 | 10 | 15 | 12 | 5 | 5 | 12 |
| methylphenyl | amount added | 2 | 5 | 6 | 4 | 1 | 1 | 4 |
| silicone polymer | molar ratios of methyl and phenyl | 4:1 | 6:1 | 8:1 | 4:1 | 5:1 | 7:1 | 6:1 |
| fluorinated acrylate monomer | | 6 | 8 | 10 | 8 | 5 | 5 | 8 |
| silicon dioxide | | 7 | 10 | 15 | 12 | 5 | 5 | 12 |
| metal catalyst | | 3 | 4 | 5 | 4 | 2 | 2 | 4 |
| thermal initiator | | 0.3 | 0.5 | 1 | 0.8 | 0.1 | 0.1 | 0.8 |
| inhibitor | | 0.5 | 0.8 | 2 | 1.5 | 0.2 | 0.2 | 1.5 |
| pearlescent pigments | | — | — | — | — | — | 5 | — |
| extinction powders | | — | — | — | — | — | 4 | — |
| bifunctional acrylic monomers | | — | — | — | — | — | — | 5 |
| auxiliary | leveling agent | 0.1 | 0.1 | 0.3 | 0.2 | 0.2 | 0.2 | 0.2 |
| | wetting and dispersing agent | 0.1 | 0.2 | 0.1 | 0.1 | 0.1 | 0.1 | 0.1 |
| | anti-setting agent | 0.3 | 0.2 | 0.1 | 0.2 | 0.2 | 0.2 | 0.2 |
| organic solvent | ethyl acetate | 10 | 5 | 10 | 0 | 0 | 0 | 0 |
| | tasteless kerosene | 20 | 20 | 20 | 35 | 20 | 20 | 20 |

TABLE 1-continued

The formulations for organic silicon coating in Embodiment 1~7 (by weight)

|  | Embodiment No. | | | | | | |
| --- | --- | --- | --- | --- | --- | --- | --- |
|  | 1 | 2 | 3 | 4 | 5 | 6 | 7 |
| n-heptane | 10 | 10 | 10 | 10 | 10 | 10 | 10 |
| butyl acetate | 5 | 5 | 10 | 0 | 0 | 0 | 0 |

Coating the resulting coating in Embodiment 1~7 according to the coating condition and base material used in Table 2.

TABLE 2

Coating condition for Embodiment 1~7

| Embodiment No. | curing temperature (° C.) | curing duration (min) | coating thickness (μm) | coating base material |
| --- | --- | --- | --- | --- |
| 1 | 90 | 20 | 5 | Stainless steel |
| 2 | 100 | 90 | 25 | Fluororubber |
| 3 | 120 | 100 | 50 | PC |
| 4 | 180 | 10 | 30 | silicone rubber |
| 5 | 150 | 60 | 40 | glass |
| 6 | 100 | 60 | 25 | ABS |
| 7 | 180 | 50 | 30 | silicone rubber |

Testing the adhesive force, normal water contact angle, oil contact angle, water contact angle after oil pollution, oil-resistance for Embodiment 1~7, while conducting boiled test, xenon lamp aging test, hot and cold impact test. The tested results are listed in Table 3.

The adhesive force is tested according to GB9286-1998 Standard Test.

Testing water contact angle and oil contact angle according to GB/T23764-2009 Standard Test.

Test for water contact angle after oil soaking: after soaking the base material coated with corresponding coating of Embodiment in room temperature into the diesel with hexadecane as main component for 10 minutes, testing the water contact angle of the coating surface polluted by oil according to GB/T23764-2009 Standard Test.

Test for dirt-resistance: sprinkling the dirt on the coating surface with soil and dust as the dirt, then soaking in hexadecane for 2 minutes, rinsing the contaminated area with tap water drops for 10 seconds and using 1 to 7 to determine the dirt washing capacity, in which 5 refers to complete rinse, 4 refers to remaining small amounts of dirt, 3 refers to remaining larger amounts of dirt, 2 refers to remaining huge amounts of dirt and 1 refers to being so difficult to be rinsed that all the dirt are remained. This determination can be resulted by taking pictures before rinsing and then comparing with the rinsed coating surface of the base material. The testing temperature is room temperature.

Boiled test: Soaking the base material coated with the coating in boiled water for 120 minutes, then observing the coating surface and testing adhesive force. It is defined as OK that various visible drawbacks cannot be observed by human eyes, and if any one of various flaws is visible, it will be defined as NO.

Xenon lamp aging test: conserving the coating under a ultraviolet light with wavelength of 340 nm and light intensity of 0.55 W/m² until cracks or other flaws that are visible to the naked eye appear. Recording the conserving duration of the coating at this point to be the longest anti-aging duration.

Hot and cold impact test: conserving the base material coated with the coating in −40° C. for 12 hours and then in 80° C. for 12 hours, once for a cycle and 10 cycles for each sample base material, observing each performance of the resulting coating surface for the occurrence of each flaw, and if there isn't any flaws visible to naked eye, the resistance of the base material to hot and cold impact is defined as OK.

The results of above tests are listed in Table 3.

TABLE 3

Test results for each performance of the coating resulted from the coating in Embodiment 1~7

| Embodiment No. | adhesive force | water contact angle (°)/oil contact angle (°) | water contact angle after oil soaking (°) | dirt-resistance | boiled test | xenon lamp aging test/ (hour) | hot and cold impact |
| --- | --- | --- | --- | --- | --- | --- | --- |
| 1 | 100/100 | 110/95 | 107 | 5 | OK | 1800 | OK |
| 2 | 100/100 | 140/110 | 138 | 5 | OK | 3000 | OK |
| 3 | 100/100 | 130/105 | 125 | 5 | OK | 2500 | OK |
| 4 | 100/100 | 120/100 | 116 | 5 | OK | 2000 | OK |
| 5 | 100/100 | 100/90 | 98 | 5 | OK | 1500 | OK |
| 6 | 100/100 | 100/90 | 98 | 5 | OK | 1500 | OK |
| 7 | 100/100 | 120/100 | 116 | 5 | OK | 2000 | OK |

From the test results of Table 3 we can see that the adhesive force of the film resulted from Embodiment 1~7 is 100/100, showing that the coatings resulted from Embodiment 1~7 are excellent in adhesion to the silicone rubber and fluororubber. Though other common coating material is added into Embodiment 6~7, each performance of the resulting coating is still similar to those in the embodiments without addition. As such, the coating provided by the present invention can add other common coating material as needed.

From Table 3 we can see that the performance of Embodiment 2 is the best and thus is the best preferable embodiment of the present invention. And the dirt is readily to remove. The water contact angle and oil contact angle of other embodiments are larger, and are effective against water and oil. Changes of the water contact angle of the oil-impregnated coating are small, showing that the anti-oil capacity of this coating is also excellent. And the contaminated dirt on this coating can be easily removed by simple rinse, showing that it has a better anti-oil performance. This coating also has excellent resistance to boiling, aging and hot and cold impact.

The foregoing is merely illustrative of the preferred embodiments of the present invention and is not intended to be limiting of the present invention, and various changes and modifications may be made by those skilled in the art. Any modifications, equivalent substitutions, improvements, and the like within the spirit and principles of the invention are intended to be included within the scope of the present invention.

What is claimed is:

1. An organic silicon coating, consisting essentially of:
   20 to 40 parts by weight of methyl vinyl organic silicon polymer,
   1 to 6 parts by weight of methyl phenyl organic silicon polymer,
   5 to 15 parts by weight of hydrogenated silicone oil,
   5 to 10 parts by weight of fluorinated acrylate monomer,
   5 to 15 parts by weight of silicon dioxide, 0.2 to 2 parts by weight of inhibitor,
0.1 to 1 part by weight of auxiliary,
0.1 to 1 part by weight of thermal initiator,
30 to 50 parts by weight of organic solvent,
and 2 to 5 parts by weight of metal catalyst,
wherein the inhibitor has a deblocking temperature of ≥80° C. against the metal catalyst, and
wherein the auxiliary is selected from the group consisting of a leveling agent, an anti-settling agent, a wetting and dispersing agent, and combinations thereof.

2. The organic silicon coating according to claim 1, consisting essentially of:
25 to 35 parts by weight of methyl vinyl organic silicon polymer,
3 to 5 parts by weight of methyl phenyl organic silicon polymer,
8 to 12 parts by weight of hydrogenated silicone oil,
7 to 9 parts by weight of fluorinated acrylate monomer,
8 to 12 parts by weight of silicon dioxide,
0.5 to 1.5 parts by weight of inhibitor,
0.3 to 0.6 part by weight of auxiliary,
0.3 to 0.7 part by weight of thermal initiator,
35 to 45 parts by weight of organic solvent,
and 3 to 5 parts by weight of metal catalyst.

3. The organic silicon coating according to claim 1, consisting of:
20 to 40 parts by weight of methyl vinyl organic silicon polymer,
1 to 6 parts by weight of methyl phenyl organic silicon polymer,
5 to 15 parts by weight of hydrogenated silicone oil,
5 to 10 parts by weight of fluorinated acrylate monomer,
5 to 15 parts by weight of silicon dioxide,
0.2 to 2 parts by weight of inhibitor,
0.1 to 1 part by weight of auxiliary,
0.1 to 1 part by weight of thermal initiator,
30 to 50 parts by weight of organic solvent, and
2 to 5 parts by weight of metal catalyst.

4. The organic silicon coating according to claim 3, consisting of:
25 to 35 parts by weight of methyl vinyl organic silicon polymer,
3 to 5 parts by weight of methyl phenyl organic silicon polymer,
8 to 12 parts by weight of hydrogenated silicone oil,
7 to 9 parts by weight of fluorinated acrylate monomer,
8 to 12 parts by weight of silicon dioxide,
0.5 to 1.5 parts by weight of inhibitor,
0.3 to 0.6 part by weight of auxiliary,
0.3 to 0.7 part by weight of thermal initiator,
35 to 45 parts by weight of organic solvent, and
3 to 5 parts by weight of metal catalyst.

5. The organic silicon coating according to claim 1, consisting essentially of:
30 parts by weight of methyl vinyl organic silicon polymer,
5 parts by weight of methyl phenyl organic silicon polymer,
10 parts by weight of hydrogenated silicone oil,
8 parts by weight of fluorinated acrylate monomer,
10 parts by weight of silicon dioxide,
0.8 parts by weight of inhibitor,
0.5 part by weight of auxiliary,
0.5 part by weight of thermal initiator,
40 parts by weight of organic solvent, and
4 parts by weight of metal catalyst.

6. The organic silicon coating according to claim 5, wherein the inhibitor is a coating inhibitor with the deblocking temperature of ≥80° C.

7. The organic silicon coating according to claim 5, wherein the molar ratio of methyl and phenyl in the methyl phenyl organic silicon polymer is 4 to 8:1.

8. The organic silicon coating according to claim 5, wherein the curing is completed at 90° C. to 180° C. in 10 to 120 minutes; and the coating thickness of the organic silicon coating is 5 to 50 µm.

9. A composite material comprising a base material and an organic silicone coating;
wherein the base material is selected from silicone rubber, fluororubber, PC, ABS, PC/ABS, PMMA, PA, TPU, PBT, PET, stainless steel, magnesium alloy or aluminum alloy; wherein the base material has a surface energy of ≥20×10-5 N/cm; and
wherein the organic silicone coating consists essentially of:
30 parts by weight of methyl vinyl organic silicon polymer,
5 parts by weight of methyl phenyl organic silicon polymer,
10 parts by weight of hydrogenated silicone oil,
8 parts by weight of fluorinated acrylate monomer,
10 parts by weight of silicon dioxide,
0.8 parts by weight of inhibitor,
0.5 part by weight of auxiliary,
0.5 part by weight of thermal initiator,
40 parts by weight of organic solvent, and
4 parts by weight of metal catalyst.

10. The composite material of claim 9, wherein the base material is silicone rubber or fluororubber.

* * * * *